US005425992A

United States Patent [19]

Tachikawa et al.

[11] Patent Number: 5,425,992

[45] Date of Patent: Jun. 20, 1995

[54] ABRASION RESISTANT WIRE

[75] Inventors: Takeshi Tachikawa; Katsuhiro Horita, both of Kanagawa, Japan

[73] Assignee: Nippon Unicar Company Ltd., Kawasaki, Japan

[21] Appl. No.: 281,402

[22] Filed: Jul. 27, 1994

[51] Int. Cl.[6] .......... B32B 9/00

[52] U.S. Cl. .......... 428/389; 428/379; 428/372; 428/921; 252/609; 524/424; 524/425; 524/427; 524/436; 524/437; 521/92; 521/93; 521/97; 521/98

[58] Field of Search .......... 428/389, 372, 921; 524/424, 425, 427, 436, 437; 252/609

[56] References Cited

U.S. PATENT DOCUMENTS

| | | | |
|---|---|---|---|
| 4,937,142 | 6/1990 | Ogushi et al. | 428/391 |
| 4,942,069 | 7/1990 | Keogh | 428/389 |
| 5,057,367 | 10/1991 | Morii et al. | 428/389 |
| 5,059,651 | 10/1991 | Ueno | 428/389 |
| 5,180,889 | 1/1993 | Rogers et al. | 428/389 |

OTHER PUBLICATIONS

Ultracarb, Microfine Minerals & Chemicals Limited, England (undated).

*Primary Examiner*—Patrick J. Ryan
*Assistant Examiner*—Kam F. Lee
*Attorney, Agent, or Firm*—Saul R. Bresch

[57] ABSTRACT

A coated wire comprising:

(i) an electrical conductor coated with (ii) a mixture of (a) two linear copolymers of ethylene and one alpha-olefin having 3 to 8 carbon atoms, the first ethylene copolymer having a density of about 0.900 to 0.930 gram per cubic centimeter and a melt index of about 0.1 to about 5 grams per 10 minutes and the second ethylene copolymer having a density of 0.931 to about 0.950 gram per cubic centimeter and a melt index of about 0.1 to about 5 grams per 10 minutes, and for each 100 parts by weight of the first ethylene copolymer, there are about 15 to about 100 parts by weight of the second ethylene copolymer, and (b) for each 100 parts by weight of component (a), there are about 65 to about 150 parts by weight of a mixture comprising huntite and hydromagnesite in a weight ratio of about 2:1 to about 1:1.

2 Claims, No Drawings

ABRASION RESISTANT WIRE

TECHNICAL FIELD

This invention relates to electrically conductive wires, which are covered with an abrasion resistant coating, and, more particularly, to the low voltage wires, typically used in automobiles, having a single coating, which serve as both insulation and an abrasion resistant jacket for the wire.

BACKGROUND INFORMATION

In recent years, the merger of the automobile with electronics has been responsible for improvements in automobile safety, operability, comfort, reliability, low fuel consumption, cleaner exhaust gas, reduced noise, navigation, radio/TV, and heating/cooling systems. In order to take advantage of all of these improvements, the number of wires required inside of an automobile has increased manyfold. This, in turn, has caused industry to seek lighter and thinner wires. But the crowding of these wires in small spaces within the automobile, even though the wires are lighter in weight and thinner in diameter, raises the problem of abrasion caused by rubbing against each other and against parts of the automobile. The abrasion is further aggravated by the various vibrations, which arise when an automobile is in use.

In addition to the problem of abrasion, automobile wires have to be resistant to heat, low temperature, humidity, oil, and the whitening caused by carbon dioxide. They also should be flame retardant.

Polyvinyl chloride (PVC) has been suggested as a coating for automobile wires, but because of the plasticizers used in PVC, there is a tendency for the coating to bleed. This can lead to sticky surfaces of both the wires and the parts with which the wires come into contact, and repair problems. Burning of PVC also leads to the evolution of harmful gases.

As a substitute for PVC, polyethylene together with a filler such as magnesium hydroxide or aluminum hydroxide has also been suggested as a coating for automobile wires. While these coatings do not contain halogens or plasticizers, they have been found to be susceptible to abrasion and whitening.

It would be desirable to provide a coated automobile wire, which, in addition to having the positive properties of PVC coated wire and wire coated with magnesium hydroxide or aluminum hydroxide filled polyethylene, does not contain halogens or plasticizers, and does not suffer from the problem of abrasion or whitening.

DISCLOSURE OF INVENTION

An object of this invention, therefore, is to provide a wire having a coating, which is highly abrasion resistant, and thus can serve in the dual function of both insulation and jacket for the wire. The coating will further have the positive properties of PVC and of the aforementioned filled polyethylene.

Other objects and advantages will become apparent hereinafter.

According to the invention, a coated wire has been discovered which meets the above object. The coated wire comprises:

(i) an electrical conductor coated with (ii) a mixture of (a) two linear copolymers of ethylene and one alpha-olefin having 3 to 8 carbon atoms, the first ethylene copolymer having a density of about 0.900 to 0.930 gram per cubic centimeter and a melt index of about 0.1 to about 5 grams per 10 minutes and the second ethylene copolymer having a density of 0.931 to about 0.950 gram per cubic centimeter and a melt index of about 0.1 to about 5 grams per 10 minutes, and for each 100 parts by weight of the first ethylene copolymer, there are about 15 to about 100 parts by weight of the second ethylene copolymer, and (b) for each 100 parts by weight of component (a), there are about 65 to about 150 parts by weight of a mixture comprising huntite and hydromagnesite in a weight ratio of about 2:1 to about 1:1.

DESCRIPTION OF THE PREFERRED EMBODIMENT(S)

The linear copolymers of ethylene, referred to above, are thermoplastic resins, preferably made by a low pressure process such as described in U.S. Pat. Nos. 4,302,565 and 4,508,842. Examples of the comonomer alpha-olefin are propylene, 1-butene, 4-methyl-1-pentene, 1-hexene, and 1-octene.

Huntite and hydromagnesite are minerals. In the refined form, they are both white crystalline powders. Huntite contains magnesium, calcium, and carbonate, and has the nominal formula $Mg_3Ca(CO_3)_4$. Hydromagnesite contains magnesium, carbonate, hydroxyl groups, and water. It has three nominal formulas, i.e., $Mg_4(CO_3)_3.(OH)_2.H_2O$; $Mg_3(CO_3)_4.(OH)_2.4H_2O$; or $3MgCO_3.Mg(OH)_2.3H_2O$.

The average particle diameter of each of the minerals can be in the range of about 0.1 to about 20 microns and is preferably in the range of about 0.2 to about 3 microns. The surface area can be about 5 to about 50 square meters per gram and is preferably about 10 to about 20 square meters per gram.

The weight ratio of huntite to hydromagnesite can be in the range of about 2:1 to about 1:1, and is preferably in the range of about 1.5:1 to about 1:1. For each 100 parts by weight of component ii(a), i.e., the mixture of ethylene copolymers, there can be about 65 to about 150 parts by weight of the mixture of huntite and hydromagnesite, and there is preferably about 90 to about 130 parts by weight of the mixture of huntite and hydromagnesite.

The minerals can be surface treated, if desired, with a saturated or unsaturated carboxylic acid having about 8 to about 24 carbon atoms and preferably about 12 to about 18 carbon atoms or a metal salt thereof. Mixtures of these acids and/or salts can be used, if desired. Examples of suitable carboxylic acids are oleic, stearic, palmitic, isostearic, and lauric; of metals which can be used to form the salts of these acids are zinc, aluminum, sodium, calcium, magnesium, and barium; and of the salts themselves are magnesium stearate, zinc oleate, sodium oleate, sodium stearate, sodium lauryl sulfonate, calcium stearate, zinc stearate, calcium palmitate, magnesium oleate, and aluminum stearate. The amount of acid or salt can be in the range of about 0.1 to about 5 parts by weight of acid and/or salt per one hundred parts by weight of mineral and preferably about 0.25 to about 3 parts by weight per one hundred parts by weight of mineral. The acid or salt can be merely added to the composition in like amounts rather than using the surface treatment procedure, but this is not preferred.

Commercial embodiments of the composition of the invention are generally obtained by mixing together the above-mentioned components with one or more antioxidants and other additives in apparatus such as a Banbury TM mixer, a pressure kneader, a twin screw extruder, a Buss co-kneader, a Henschel mixer, or a roll kneader at temperatures in the range of about 120° C. to about 240° C. for about 5 to about 15 minutes. The mixtures are typically pelletized and then extruded around a preheated (100° to 180° C.) copper wire using a conventional extruder and conventional extruder techniques at temperatures generally in the range of 140° to 210° C. and a processing speed of 300 to 1000 meters per minute.

Typical wire gauges for automobile wire are in the range of 14 to 24 AWG (American Wire Gauge), and typical thicknesses of the coating extruded around the wire for automobile use are in the range of 10 to 45 mils.

Useful additives for the composition of the invention are antioxidants, surfactants, reinforcing filler or polymer additives, crosslinking agents, ultraviolet stabilizers, antistatic agents, pigments, dyes, slip agents, plasticizers, lubricants, viscosity control agents, extender oils, metal deactivators, water tree growth retardants, voltage stabilizers, flame retardant additives, and smoke suppressants. These additives can be present in amounts of about 0.1 to about 5 parts by weight based on 100 parts by weight of thermoplasic resin.

Examples of antioxidants are: hindered phenols such as tetrakis[methylene (3,5-di-tert-butyl-4-hydroxyhydrocinnamate )]-methane and thiodiethylene bis(3,5-di-tert-butyl- 4-hydroxy)hydrocinnamate; phosphites and phosphonites such as tris(2,4-di-tert-butylphenyl) phosphite and di-tert-butylphenylphosphonite; various amines such as polymerized 2,2,4-trimethyl-1,2-dihydroquinoline; and silica. Antioxidants are used in amounts of about 1 to about 5 parts by weight per hundred parts by weight of thermoplastic resin.

The advantage of the invention is that a coated wire is provided wherein the coating serves the dual function of insulation and abrasion resistant jacket, which is particularly useful for automobile wires, and, further, the coating is whitening resistant, heat resistant, and low temperature brittleness resistant, and yet has the quality of softness. Further, the extrusion can be carried out at high speed without foaming.

The patents mentioned in this specification are incorporated by reference herein.

The invention is illustrated by the following examples.

EXAMPLES 1 TO 10

In the examples, the performance of the composition, which is to be used for coating the wire, is evaluated by using strip type specimens and dumb-bell type specimens except as otherwise noted. Specimens used in tests 1, 2, 4, 5, and 9 are defined in section 3.2.2 of JIS K 6301. Specimens used in test 3 are defined in ASTM D-2863, Type A. Specimens used in test 7 are defined in section 25.1.1-(3) of JIS C 3005.

The components of the composition are kneaded through a Banbury TM mixer at 180° C. for 10 minutes and then granulated pellets. Sheets of 3 millimeters, 2 millimeters, and 1 millimeter in thickness, 150 millimeters in length, and 180 millimeters in width are obtained by subjecting these pellets to preheating at 180° C. for 5 minutes and pressing for 3 minutes at a pressure of 150 kilograms per square centimeter in a heat pressing machine. The sheets are then press punched into the specimens.

Various physical properties are measured as follows:

1. Tensile strength: Five dumb-bell specimens, each one millimeter in thickness, are tested in accordance with JIS C 3005 at a tensile speed of 200 millimeters per minute.

2. Elongation: Five dumb-bell specimens, each one millimeter in thickness, are tested in accordance with JIS C 3005 at a tensile speed of 200 millimeters per minute.

3. Limiting Oxygen Index (LOI): Five strip type specimens are tested in accordance with ASTM D-2863.

4. Thermal aging: Five dumb-bell specimens, each one millimeter in thickness, are tested in accordance with JIS C 3005 at a temperature of 120° C. for 5 days in an oven.

5. Carbon dioxide gas whitening: The degree of whitening is determined by measuring the weight increase of five dumb-bell specimens, each 1 millimeter in thickness, exposed to a carbon dioxide gas stream containing moisture. The exposure is effected in a glass chamber having a volume of 50 cubic centimeters. The carbon dioxide is introduced into the chamber after bubbling through water at room temperature to provide a gas stream having a relative humidity greater than 90 percent. The flow rate of the carbon dioxide is 30 cubic centimeters per minute; the residence time of the specimens is one week; and the ambient temperature is in the range of about 20° to 35° C.

6. Abrasion resistance: Two sets of five specimens (coated wire) each are tested in accordance with the blade reciprocating method in section 11.2 of JASO (Japan Automobile Standard Organization) D-611 at a coating thickness of 0.3 millimeter (11.8 mils), one set at a loading of 5 kilograms and the other set at a loading of 7 kilograms. The result is the number of times the blade reciprocates before it touches the wire.

7. Heat resistance: Five strip type specimens are tested in accordance with section 25 of JIS C 3005 at a temperature of 120° C.

8. Low temperature brittleness resistance: Five dumb-bell specimens are tested in accordance with JIS K 7216.

9. Oil resistance: Five dumb-bell specimens, each one millimeter in thickness, are tested in accordance with JIS K-7114.

10. Softness: Five specimens are tested in accordance with JIS K 6301.

11. Texture of coating: Pellets are extruded about a core wire made up of seven copper strands, each having a diameter of 0.32 millimeter, at a temperature of 180° C. to provide a coating 0.3 millimeter thick (11.8 mils). The diameter of the core wire is 1.0 millimeter and the outer diameter of the coated core wire (cable) is 1.6 millimeter. The cross-sectional area of the core wire is 0.5629 square centimeter.

12. Melt index is measured at 190° C. under a loading of 2.16 kilograms in accordance with JIS (Japanese Industrial Standard) K-6760.

The components of the mixture used in example 1 are as follows:

(1) 66.6 parts by weight of a low pressure, linear low density ethylene/1-butene copolymer having a density of 0.927 gram per cubic centimeter and a melt index of 0.8 gram per 10 minutes;

(2) 33.3 parts by weight of a low pressure, linear medium density ethylene/1-butene copolymer having a density of 0.935 gram per cubic centimeter and a melt index of 0.2 gram per 10 minutes;

(3) 120 parts by weight of a particulate mixture of huntite and hydromagnesite in a weight ratio of 1:1; the average particle size is 0.3 micron; and the particles are surface treated with stearic acid; and (4) 0.8 parts by weight of an antioxidant, i.e., tetrakis[-methylene (3,5-di-tert-butyl-4-hydroxyhydrocinnamate )]methane.

The components of the mixture used in example 2 are as follows:

(1) 50 parts by weight of a low pressure, linear low density ethylene/1-butene copolymer having a density of 0.910 gram per cubic centimeter and a melt index of 0.5 gram per 10 minutes;

(2) 50 parts by weight of a low pressure, linear medium density ethylene/1-butene copolymer having a density of 0.950 gram per cubic centimeter and a melt index of 0.15 gram per 10 minutes;

(3) 120 parts by weight of a particulate mixture of huntite and hydromagnesite in a weight ratio of 1:1; the average particle size is 0.3 micron; and the particles are surface treated with stearic acid; and (4) 0.8 parts by weight of an antioxidant, i.e., tetrakis[-methylene (3,5-di-tert-butyl-4-hydroxyhydrocinnamate )]methane.

Example 3: example 1 is repeated except that the amount of component 2 is reduced to 10 parts by weight. Abrasion resistance, heat resistance, and oil resistance are found to be insufficient.

Example 4: example 1 is repeated except that the amount of component 2 is increased to 120 parts by weight. Elongation and softness are found to be insufficient.

Example 5: example 1 is repeated except that the density of component 1 is lowered to 0.895 gram per cubic centimeter. Abrasion resistance and oil resistance are found to be insufficient.

Example 6: example 1 is repeated except that the density of component 2 is raised to 0.955 gram per cubic centimeter. Elongation, softness, and processability are found to be insufficient.

Example 7: example 1 is repeated except that the weight ratio of huntite to hydromagnesite is 2.5:1. Flame retardance is found to be insufficient.

Example 8: example 1 is repeated except that the weight ratio of huntite to hydromagnesite is 0.83:1. Whitening resistance, abrasion resistance, and processability are found to be insufficient.

Example 9: example 1 is repeated except that component 3 is used in an amount of 60 parts by weight. Flame retardance is found to be insufficient.

Example 10: example 1 is repeated except that component 3 is used in an amount of 160 parts by weight. Mechanical strength, abrasion resistance, whitening resistance, low temperature brittleness resistance, softness, and processability are found to be insufficient.

The test results of examples 1 to 10 are set forth in the following Table. Each value given is the average value for all of the specimens tested.

TABLE

| Test | Example 1 | Example 2 | Example 3 | Example 4 | Example 5 |
|---|---|---|---|---|---|
| tensile strength (kg/cm$^2$) | 166 | 170 | 170 | 210 | 175 |
| elongation (%) | 600 | 350 | 600 | 5 | 600 |
| LOI (minutes) | 25 | 25 | 25 | 25 | 25 |
| thermal aging: | | | | | |
| residual tensile strength (%) | 92 | 90 | 92 | 92 | 94 |
| residual elongation (%) | 92 | 91 | 92 | — | 94 |
| whitening (%) | 0.49 | 0.45 | 0.5 | 0.5 | 0.45 |
| abrasion resistance: | | | | | |
| 5 kilograms | 300 | 300 | 30 | 300 | 20 |
| 7 kilograms | 300 | 300 | 5 | 300 | 5 |
| heat resistance (%) | 15 | 20 | 40 | 5 | 35 |
| low temperature brittleness resistance (°C.) | minus 15 | minus 15 | minus 15 | minius 15 | minus 15 |
| oil resistance: | | | | | |
| change in weight (%) | plus 0.2 | plus 0.2 | plus 1.0 | zero | plus 1.0 |
| change in length (%) | zero | zero | plus 0.5 | zero | plus 0.5 |
| change in thickness (%) | zero | zero | plus 0.5 | zero | plus 0.5 |
| residual tensile strength (%) | 100 | 100 | 81 | 85 | 85 |
| residual elongation (%) | 100 | 100 | 65 | — | 70 |
| softness (kg/cm$^2$) | 2580 | 2760 | 1950 | — | 2030 |
| texture of coating | excellent | excellent | excellent | excellent | excellent |

| Test | Example 6 | Example 7 | Example 8 | Example 9 | Example 10 |
|---|---|---|---|---|---|
| tensile strength (kg/cm$^2$) | 160 | 190 | 150 | 180 | 90 |
| elongation (%) | 5 | 600 | 180 | 600 | 450 |
| LOI (minutes) | 25 | 19 | 28 | 20 | 30 |
| thermal aging: | | | | | |
| residual tensile strength (%) | 95 | 95 | 95 | 95 | 95 |
| residual elongation (%) | 95 | 95 | 95 | 95 | 95 |
| whitening (%) | 0.41 | 0.21 | 0.91 | 0.3 | 1.2 |
| abrasion resistance: | | | | | |
| 5 kilograms | 300 | 300 | 60 | 300 | 100 |
| 7 kilograms | 300 | 300 | 20 | 300 | 10 |
| heat resistance (%) | 5 | 15 | 15 | 15 | 15 |
| low temperature | minus 15 | minus 15 | minus 15 | minus 15 | minus 5 |

TABLE-continued

| | | | | | |
|---|---|---|---|---|---|
| brittleness resistance (°C.) | | | | | |
| oil resistance: | | | | | |
| change in weight (%) | zero | zero | zero | zero | zero |
| change in length (%) | zero | zero | zero | zero | zero |
| change in thickness (%) | zero | zero | zero | zero | zero |
| residual tensile strength (%) | 100 | 100 | 100 | 100 | 100 |
| residual elongation (%) | 100 | 100 | 100 | 100 | 95 |
| softness ($kg/cm^2$) | 3550 | 2750 | 2180 | 2490 | 1950 |
| texture of coating | poor | excellent | poor | excellent | poor |

We claim:

1. A coated wire comprising:

(i) an electrical conductor coated with (ii) a mixture consisting essentially of (a) two linear copolymers of ethylene and one alpha-olefin having 3 to 8 carbon atoms, the first ethylene copolymer having a density of about 0.900 to 0.930 gram per cubic centimeter and a melt index of about 0.1 to about 5 grams per 10 minutes and the second ethylene copolymer having a density of 0.931 to about 0.950 gram per cubic centimeter and a melt index of about 0.1 to about 5 grams per 10 minutes, and for each 100 parts by weight of the first ethylene copolymer, there are above 15 to about 100 parts by weight of the second ethylene copolymer, and (b) for each 100 parts by weight of component (a), there are about 65 to about 150 parts by weight of a particulate mixture comprising huntite and hydromagnesite in a weight ratio of about 1.5:1 to about 1:1 wherein the average particle size is in the range of about 0.1 to about 0.5 microns and the particles are surface treated with a carboxylic acid or a salt thereof.

2. The composition defined in claim 1 wherein for each 100 parts by weight of component 1(*a*), component 1(*b*) is present in an amount of about 90 to about 130 parts by weight.

* * * * *